United States Patent
Bakker

[15] 3,642,505
[45] Feb. 15, 1972

[54] MANUFACTURE OF MULLITE REFRACTORY GRAIN AND PRODUCT

[72] Inventor: Wate Thewis Bakker, Severna Park, Md.
[73] Assignee: General Refractories Company, Philadelphia, Pa.
[22] Filed: July 11, 1968
[21] Appl. No.: 743,935

[52] U.S. Cl. .................................................106/65, 126/67
[51] Int. Cl. .........................................................C04b 35/10
[58] Field of Search ...........................106/65, 67, 72; 23/110

[56] References Cited

UNITED STATES PATENTS 3,336,108   8/1967   Leatham et al. ........................106/65
3,366,445   1/1968   Einstein et al. .........................106/72

*Primary Examiner*—James E. Poer
*Attorney*—McClure and Weiser and Everett H. Murray, Jr.

[57] ABSTRACT

A process for manufacturing a mullite refractory grain from raw bauxite ore which comprises subjecting minute particles of the dry finely, crushed ore to a high pressure and calcining the product at relatively moderate temperatures for a short period of time. The refractory grain product obtained has a high density and a low porosity; it consists essentially of interlocking mullite crystals with only very minor amounts of siliceous glass and alpha-alumina crystals.

12 Claims, No Drawings

MANUFACTURE OF MULLITE REFRACTORY GRAIN AND PRODUCT

Mullite ($3Al_2O_3 \cdot 2SiO_2$) is the richest (71.8% $Al_2O_3$) and the most refractory of all alumina silicates. It is the stable component in the two phase system $Al_2O_3 \cdot SiO_2$.

Conventionally mullite has been produced from various alumina-silica ores containing approximately 70–80 percent alumina after calcination at elevated temperatures. These ores generally are a mixture of gibbsite ($Al(OH)_3$) and kaolinite ($Al_2Si_2O_5(OH)_4$) with minor amounts of impurities, mainly titania ($TiO_2$) and iron oxide ($Fe_2O_3$). It is believed that during the calcination the gibbsite is dehydrated at about 310° C. and at temperatures in the range of 1,090° to 1,200° C., it is ultimately converted to alpha-alumina. Kaolinite is also dehydrated at about 590° C. and is finally converted to a mixture of cristobalite ($SiO_2$) and mullite. The product thus obtained is not mullite only but a mixture with cristobalite and alpha-alumina. It is highly desirable to obtain a product essentially only of mullite, a truly dense refractory grain.

The production of a refractory grain composed essentially only of mullite, free of intermediate reactants has been sought by those skilled in the art by extending the duration of the calcination and by raising the firing temperatures. Yet, notwithstanding these measures, the conversion to a highly dense refractory mullite material remains unsatisfactorily low and is often incomplete. The desired equilibrium phase of the alumina-silica system is not completely obtained and the calcined product consists of a mixture of mullite, alpha alumina, and cristobalite or siliceous glass. Generally, such a calcine has an unsatisfactory low bulk specific gravity; its physical properties also are not satisfactory.

One method known in the art proposes producing a refractory material of high mullite content by reacting kaolinite ($2SiO_2 \cdot Al_2O_3 \cdot 2H_2O$) and boehmite ($Al_2O_3 \cdot H_2O$), these two raw material giving amorphous gamma alumina upon thermal decomposition, and a mullite material upon further treating. Yet, the mullite content of the product is limited to 80 to 85 percent. It has also been reported that even when a composition of 71.8 percent alumina is used which theoretically should yield a 100 percent mullite, the final composition does not exceed 75 percent mullite under the most favorable conditions.

Further attempts of the prior art are described in the patent literature. U.S. Pat. No. 2,310,953 makes a ceramic material from natural dehydrated bauxite containing 57 to 58 percent alumina by grinding it in the presence of a magnesium compound, and then subsequently firing to a conglomerate.

U.S. Pat. Nos. 2,339,264 and 2,347,685 which also use bauxite convert it to an aluminous ceramic by various techniques involving drying, grinding and fusing. Yet, in all these patents, the ceramics are not mullite, but apparently consist of corundum.

Likewise, U.S. Pat. Nos. 2,310,953, 2,339,264 and 2,347,685 show various conventional techniques giving a product which is either not satisfactory as a refractory product or a product which also is not mullite, but, for instance, corundum.

It is evident that there is a serious need for an efficient method for making a mullite material, such as in the form of an aggregate which is a highly dense, low porosity refractory grain comprising essentially only mullite.

The invention overcomes the numerous problems which confronted the workers skilled in the art of refractories in the making of a mullite refractory grain.

The invention provides a mullite aggregate of low porosity and high density composed essentially only of crystalline mullite. The most favored composition of the invention contains at least 90 percent or even at least 95 percent mullite. The remainder of the aggregate consisting mainly of alpha alumina, which is also a highly refractory mineral, and siliceous glass. The amount of alpha alumina present depends on the alumina content of the original bauxite. Bauxite containing about 70% $Al_2O_3$ (calcined basis) yields an aggregate having little or no alpha alumina, while bauxite containing about 75% $Al_2O_3$ (calcined basis) may yield a product having up to 10 percent alpha alumina.

The invention provides further a highly efficient process for producing a mullite aggregate at lower temperatures and shorter calcination temperatures than are used in conventional processes.

The invention provides a process for making mullite from siliceous raw bauxite containing mainly kaolinite and gibbsite and at least 50 percent by weight of $Al_2O_3$, or at least 70 percent by weight of $Al_2O_3$ on a calcined basis.

The invention provides a process for making refractory mullite grain by a reaction involving alpha and possibly kappa alumina and cristobalite or a siliceous glass. While not limiting the invention to a particular theory, it is thought that in the process of the invention the gibbsite undergoes phase changes to chi alumina (at about 300° C.), kappa alumina (at about 800° to 900° C.) and to alpha alumina (at about 1,150° C.). The alpha alumina reacts with the cristobalite to form mullite. Gamma alumina is traditionally considered to be the most reactive form of alumina and is, therefore, thought to react more quickly with cristobalite to form mullite. Yet, in accordance with this invention a mullite grain of excellent physical properties is obtained from a raw material which did not contain gamma alumina during any stage of the calcination process.

In accordance with the process of the invention, substantially dry siliceous raw bauxite which contains at least about 70 percent, generally 70 to 80 percent, by weight of $Al_2O_3$ (calcined basis) is ground to a substantially uniform fineness. Desirably, the material is ground to a particle fineness so that at least 80 percent by weight thereof is not greater than 200 mesh size; ideally all of it should be not more than 200 mesh size.

The raw dry bauxite used in accordance with the invention has a moisture content not more than about 15 percent, generally in the range of 7 to 15 percent.

Grinding of the raw, dry bauxite can be carried out by any of the suitable procedures that yield a material of substantially uniform fineness. For this purpose, various grinding mills are suitable, such as impact mills, fluid energy mills, ball mills and disc and roll pulverizers. Fluid energy mills are especially suitable. Reduction of particle size is achieved by impacting opposite streams of the ore against each other at high velocities, thereby causing maximum attrition with minimum contamination. The grinding step concurrently causes a uniform distribution of the impurities which may be present in the ore; this contributes to a product of more reliable physical properties. A grinding unit which is so controlled to produce an ore at least 80 percent of which is 200 mesh size or smaller particles in one passage through the grinding zone is especially desired. No classifying unit is then necessary and the ground ore can then be sent forward directly to the pelletizing or briquetting machine. If a screening or classifying unit is desired, an air classification system is preferred because of the small particle size of the powder to be classified. It is characteristic of the process of the invention that it obviates a preliminary calcining or burning step of the ore, a practice which has been described in a number of patents. If the raw bauxite does not have that low a moisture content to begin with, it may be heated to bring its moisture content down to that range.

The ground ore is then subjected to high pressure, the highest attainable practical pressures being desirable to obtain a pellet which is as dense as possible.

The ground ore under pressure is formed into the desired shape to give a dense pellet. For this purpose, extrusion pelletizers, revolving disc pelletizers, and briquetting presses are suitable. Optionally, water is added to the particulated ore to obtain the requisite moldability. Generally, a briquetting press is the preferred pelletizing device as this unit is capable of producing the densest pellet with a minimum amount of moisture. The forming pressure may be as high as 30,000 p.s.i.

Thus, "green" pellets (pellets prior to calcining) with a density of 1.6–1.8 g./cc. may be obtained. Extrusion pelletizers are also suitable, but the density of the pellets obtained with this device is generally a little lower, about 1.6–1.70 g./cc. The green pellets are generally directly fed into a suitable kiln without preliminary drying. However, to minimize the risks of disintegrating the pellets, it is conventional to take suitable precautions to avoid overheating of the cold end of the kiln.

The pellets are then calcined, i.e., dehydrated, then the silica and alpha alumina are reacted to form the mullite crystals which are then sintered. The heat treatment results in a grain composed of a maximum of mullite crystals and a minimum of amorphous material. Sintering of the particles produces a dense aggregate consisting essentially of interlocking mullite crystals with only minor amounts of siliceous glass and alpha alumina crystals.

It is a most noteworthy aspect of the process of the invention that a refractory mullite aggregate of the desired physical properties is obtained by subjecting the pellets to a temperature in the range of 1,535°, preferably 1,590° to 1,700° C. for a period as short as less than an hour. Very satisfactory aggregates are obtained when the residence time in the hot zone of the kiln is about 15 to about 60 minutes, in rotary kilns 15 to 40 minutes residence in the hot zone is generally adequate. The products are allowed to cool, either slowly or rapidly as may be desired.

It appears that in accordance with the invention there is attained a remarkable rapid rate of reaction between the essential elements, silica and alumina to form the mullite; the necessary phase equilibrium between crystalline and liquid materials is thus very rapidly attained. It is noteworthy that during calcination (dehydration) of the material up to about 1,100° C., no appreciable increase in density of the material is noted; during the reaction between the silica and alpha alumina to form mullite in the temperature range of 1,100° to 1,500° C., an increase in density of about 0.4 g./cc. takes place. During the final stage of mullite formation or after mullite formation has been completed in the range of 1,500° to 1,600° C., the major in increase in density—0.9–1.0 g./cc.—takes place.

Another noteworthy aspect is that at temperatures higher than the preferred calcination temperature of the process of the invention, the calcined product is practically volume stable. This indicates that it consists essentially of mullite crystals, with very little residual unreacted siliceous and aluminous material present which might react to form additional mullite, thus causing expansion. The refractory grain thus produced has an apparent porosity not greater than 10 percent and preferably less than 7 percent.

Additional description regarding the bauxite starting materials, techniques for processing same, uses for the refractories and other similar information which is not part of the invention as claimed is known in the art as described, for instance, in *Encyclopedia of Chemical Technology*, Kirk and Othner, Vol. II, 1953, under the Chapter "Refractories" and in *Fused Cast Refractories*, Litvakovskii, National Science Foundation, Washington, D.C., 1961, particularly the sections on Alumina-Silicate Refractories, both references being incorporated herein by reference.

The following are not limiting, illustrative examples of the invention. The examples also contrast the results obtained by following the teaching of the invention and by departing therefrom.

EXAMPLE 1

Crude Alabama bauxite (moisture content of about 10 percent, of the chemical analysis shown in Table I below (sample A) is ball-milled to provide several lots of a raw bauxite of the fineness set forth below in Table II:

TABLE I

| Chemical Composition Percent by weight | Alabama Bauxite | |
|---|---|---|
| | Sample A | Sample B |
| L.O.I.* | 27.04 | 26.76 |
| SiO$_2$ | 13.04 | 14.64 |
| Fe$_2$O$_3$ | 0.64 | 0.84 |
| TiO$_2$ | 2.85 | 2.60 |
| Alkalies | 0.08 | 0.15 |
| Earth alkalies | 0.01 | 0.15 |
| Al$_2$O$_3$ | 55.35 | 53.96 |
| Al$_2$O$_3$ (loss free) | 75.86 | 73.68 |

*L.O.I.—weight loss on ignition

TABLE II

| Sample | Ball Milling Time | Grain size of Ore of < 200 Mesh (percent) | BSG of products |
|---|---|---|---|
| 1 | 0* | 72 | 2.71 |
| 2 | 1 | 78 | |
| 3 | 2 | 84 | 2.82 2.87 |
| 4 | 84 | 84 | 2.89 |

*Pulverized prior to use

The ball-milled bauxites were pressed into 6×1.5×1.5-inch bars on a hydraulic press at 4,000 p.s.i., then fired for 5 hours at 1,705° C.

Samples 1 and 2, which are inadequately crushed and have a particle size exceeding the limits prescribed herein, give products of inadequate density; this despite the fact that the bars were calcined at a temperature higher than required. Bauxite which is ground to the size prescribed gives a product of the requisite density, as shown in Table II, above.

EXAMPLE 2

Crude, dry Alabama bauxite (moisture content 10%) of the chemical analysis shown in Table I above (sample B) is ground to 95 to 100 percent 200 particle size mesh in a laboratory hammermill and then shaped and extruded under pressure into 6×2×2-inch bars. The bars are fired for 1 hour at the various temperatures shown in Table III below from about 1,480° to 1,705° C. The sintered, dense mullite refractories had a BSG of at least 2.9, when the requisite firing temperatures were used.

TABLE III

| Firing Temperature (° C.) | BSG of Product |
|---|---|
| 1481 | 2.02 |
| 1535 | 2.91 |
| 1594 | 3.00 |
| 1649 | 2.97 |
| 1705 | 2.91 |

Residence time was 1 hour, heat up time about 3 to 4 hours. The total porosity of the sintered aggregates did not exceed 7.

The data indicate that maximum density is obtained at 1,594° C. and acceptable densities are reached at 1,535° C. At temperatures above 1,600° to 1,650° C., a minor decrease in density of about 0.05 g./cc. takes place.

EXAMPLE 3

Various lots of crude Alabama bauxite (moisture content not over 14 percent) of the chemical analysis shown in Table I containing 69 to 77% Al$_2$O$_3$ (calcined basis) were processed in various ways. Some lots were not ground before processing, other ground to various mesh sizes, and then calcined on a 125 foot rotary kiln at 1,650° C. The residence time in the kiln was 1 hour, in the firing zone it was 15 minutes.

The results of the processing of the various ore lots under different conditions are reported below in Table IV.

TABLE IV

| Grinding of ore (percent) | Pelletizing[1] | BSG | Apparent porosity |
|---|---|---|---|
| None | Less than ⅛" ore pelletized only. | 2.69–2.77 | [2] |
| 45 to 60% ≦200 mesh | 100% pelletized density 1.6 to 1.7 (g./cc.). | 2.77–2.88 | 7–12 |
| 75 to 85% ≦200 mesh | 100% pelletized density 1.6 to 1.7 (g./cc.). | 2.90–2.94 | 5–8 |

[1] Extrusion type pelletizer.
[2] Material was not homogeneous.

The results show that ore which has been inadequately or not ground or partially pelletized ore gave an unsatisfactory aggregate product with low BSG's varying over a wide range. Ore processed in accordance with the invention as shown in Table III consistently gave sintered, highly dense aggregates consisting essentially only of mullite grains.

I claim:

1. A process for making a mullite aggregate which comprises
   grinding in the absence of water a siliceous bauxite ore comprising a major proportion of gibbsite ($Al(OH)_3$) and of kaolinite ($Al_2Si_2O_5(OH)_4$) and having a moisture content of about 7 to 15 percent of water until not more than 20 percent by weight thereof exceeds 200 mesh size,
   compressing said ground ore into dense pellets,
   calcining and sintering said compressed ore at a temperature of at least 1,535° C., and
   obtaining a a volume stable mullite aggregate of interlocking, sintered mullite crystals essentially comprising only mullite, the remainder being alpha-alumina and siliceous glass, said aggregate having a minimum bulk specific gravity of 2.9 and a porosity of less than 7 percent.

2. A process for making a mullite aggregate of high density and low porosity of essentially only crystalline mullite, the remainder being alpha-alumina and siliceous glass, which consists of
   reducing, in the absence of water, a dry siliceous bauxite ore having a content of about 70 to 80 percent by weight of $Al_2O_3$ (on a calcined basis) and not more than about 15 percent by weight moisture to a particle size so that at least about 20 percent by weight of the ore is not greater than 200 mesh size,
   subjecting the ground ore to pressure and shaping into dense pellets of a minimum bulk specific gravity of about 1.50,
   calcining said pellets and sintering said calcined pellets at a temperature in the range of about 1,535° to 1,700° C., and
   obtaining a volume stable mullite aggregate of interlocking sintered mullite crystals having a minimum bulk specific gravity of at least 2.9 and a porosity of less than 7 percent and comprising essentially only crystalline mullite, the remainder being alpha-alumina and siliceous glass.

3. The process of claim 2 in which the dry siliceous bauxite ore has a particle size so that at least about 80 percent by weight thereof is not greater than 200 mesh size.

4. The process of claim 2 in which the ore is pressed into pellets having a minimum bulk specific gravity of about 1.6.

5. The process of claim 2 in which the calcining is carried out for about 15 to 60 minutes.

6. A process for making a mullite, crystalline aggregate of high density and low porosity of essentially only mullite, which consists of
   grinding, in the absence of water, a dry siliceous bauxite ore having a content of about 70 to 80 percent by weight of $Al_2O_3$ (on a calcined basis), to a particle size so that at least about 20 percent by weight is not greater than 200 mesh size,
   pelleting the particles under high pressure at least until the ore has a minimum bulk specific gravity of about 1.6,
   calcining and sintering said compressed ore at a temperature in the range of about 1,535° to 1,700° C. for about 15 to 60 minutes, and
   obtaining a volume stable mullite aggregate of interlocking mullite crystals of at least 90 percent crystalline mullite, a bulk specific gravity of a minimum of 2.9 and a porosity of less than 7 percent.

7. The process of claim 1 further characterized in that said grinding is accomplished by fluid energy milling.

8. The process of claim 1 further characterized in that the steps from grinding onward are carried out without the addition of water.

9. The process of claim 2 characterized in that substantially no water is added in said process.

10. The process of claim 1 characterized in that said ore is kept dry during said process.

11. The process of claim 6 characterized in that no water is added during said process.

12. The process of claim 11 further comprising the step of air classifying said reduced particles to obtain said particle size of at least 20 percent by weight not greater than 200 mesh size.

* * * * *